(12) United States Patent
Dent (10) Patent No.: US 7,133,647 B2
(45) Date of Patent: Nov. 7, 2006

(54) CHIPRATE CORRECTION IN DIGITAL TRANSCEIVERS

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 598 days.

(21) Appl. No.: 10/252,338

(22) Filed: Sep. 23, 2002

(65) Prior Publication Data

US 2004/0058653 A1    Mar. 25, 2004

(51) Int. Cl.
*H04B 1/40* (2006.01)
*H04B 1/06* (2006.01)
*H04B 7/00* (2006.01)

(52) U.S. Cl. .......................... 455/75; 455/76; 455/173; 455/255; 455/256; 455/257; 455/258; 455/259; 260/85; 260/86; 375/343; 375/344; 375/375; 375/376; 370/505; 370/506; 370/507; 370/508

(58) Field of Classification Search ........ 370/505–508; 375/375–376, 343–344; 455/517, 255–260, 455/85–86, 75–76
See application file for complete search history.

(56) References Cited

U.S. PATENT DOCUMENTS

| 5,299,291 A | 3/1994 | Ruetz |
| 5,742,908 A | 4/1998 | Dent |
| 5,889,759 A * | 3/1999 | McGibney ................. 455/517 |
| 5,943,606 A | 8/1999 | Kremm et al. |
| 6,023,477 A | 2/2000 | Dent |
| 6,058,306 A | 5/2000 | Liu |
| 6,222,874 B1 * | 4/2001 | Walley et al. ............... 375/344 |
| 6,278,867 B1 | 8/2001 | Northcutt et al. |
| 6,289,067 B1 | 9/2001 | Nguyen et al. |
| 6,810,093 B1 * | 10/2004 | Zeng ......................... 375/343 |
| 2001/0002913 A1 | 6/2001 | Khalifa et al. |

FOREIGN PATENT DOCUMENTS

EP    1239625    11/2002

OTHER PUBLICATIONS

PCT WO 01/24410 A1, International Publication Date Apr. 5, 2001.
PCT WO 00/48346, International Publication Date Aug. 17, 2000.
Classen, F. et al: "An All Feedforward Synchronization Unit for Digital Radio" Personal Communication—Freedom Through Wireless Technology. Secaucus, NJ, May 18-20, 1993, Proceedings of the Vehicular Technology Conference, New York, IEEE, US, vol. Conf. 43, 198 May 1993, pp. 738-741, XP000393288 ISBN: 0-7803-1267-8.

* cited by examiner

*Primary Examiner*—Lee Nguyen
*Assistant Examiner*—Wen Huang
(74) *Attorney, Agent, or Firm*—Coats & Bennett, P.L.L.C.

(57) ABSTRACT

A transceiver for a code division multiple access communication system comprises a receiver to receive coded information signals and a transmitter to transmit coded information signals. A local oscillator provides a time and frequency reference for the receiver and the transmitter. A timing controller provides timing signals for the receiver and the transmitter. A signal processor decodes received signals to determine a common error associated with the timing controller. A timing correction circuit smoothly adjusts the timing of the coded information signals transmitted by the transmitter responsive to the timing error to reduce the timing error over a desired time interval.

16 Claims, 7 Drawing Sheets

The convolution product of the channel and its time-reverse conjugate

CHIPRATE CORRECTION IN DIGITAL TRANSCEIVERS

BACKGROUND OF THE INVENTION

The invention relates to timing control for high chiprate cellular CDMA systems, and more particularly to a method and apparatus for smoothly varying timing in response to either open loop or closed loop control mechanisms to correct for timing drift.

It is known in digital transceivers to derive both the transmit and receive frequencies from the same, accurate crystal reference oscillator, such as a voltage controlled oscillator (VCO). The standard known as the Global System for Mobile Communications (GSM) for digital cellular systems, for example, specifies that the network base stations shall lock the transmitted bitrate of 13 MHz/48 to the same frequency reference source as the radio frequency channels, which are multiples of 13 MHz/65. Accordingly, 13 MHz is a convenient choice for the reference oscillator frequency.

Mobile terminals use a technique known as automatic frequency correction (AFC) to lock their transmit and receive frequencies to the base station frequency reference. The mobile terminals receive and decode the base station transmissions and derive a frequency error representing the difference between the mobile terminal's frequency standard and the frequency of the received signal. The frequency error is then used to correct the mobile terminal's frequency standard by changing a control voltage applied to the VCO.

In many mobile terminals, the VCO from which all transmit and receive frequencies are derived is also used to generate all digital chiprates and bitrates. In time division multiple access (TDMA) systems, frame and slot timing is implicitly controlled since frame and slot periods are simply a specified number of bit periods. The bitrate/chiprate accuracy may need to be higher than radio channel frequency accuracy, in order to avoid the phenomenon of bitslip or mis-synchronization, particularly during periods of temporary signal outage as a result of fading.

Notwithstanding the use of the same frequency reference as both a frequency and timing standard, multipath fading due to motion of the mobile terminal causes Doppler-type frequency errors in the received signal. Due to multipath propagation, the multipath rays can be received from behind or in front of the mobile terminal relative to the direction of movement of the mobile terminal and therefore may be of any sign. As these multipath rays fluctuate, the frequency error perceived by the mobile terminal receiver fluctuates and becomes partially transferred to the crystal reference oscillator resulting in a small frequency error. This frequency error causes the timing to drift from an expected timing standard. For example, a mobile terminal operating according to the Universal Mobile Telecommunication System (UMTS) standard transmits at a chiprate of 3.84 megachips (complex QPSK chips) per second. Experience teaches that the crystal reference oscillator can be corrected by automatic frequency correction (AFC) to an accuracy of about 0.1 ppm. Thus, using the reference oscillator to derive the chiprate causes a timing drift of +/−0.384 chips/sec.

Another source of timing drift is relative motion. At 60 miles/hour vehicle speed, the loop path length is changing at +/−120 miles/hour, or 54 meters/sec. The loop delay is thus changing at +/−0.18uS/sec, which is +/−0.69 chips/sec. In total therefore, the timing drift can be up to +/−1 chip per second. The error induced by multipath fading and relative motion is typically corrected by two additional mechanisms: an open loop timing correction mechanism and a closed loop timing correction mechanism.

The open loop timing correction mechanism comprises determining, at the mobile terminal, the timing at which an assigned slot was received. Since the timing also fluctuates appreciably (several bit periods) due to the multipath propagation, the value is smoothed by a simple low pass filter having a smoothing time constant of several frames. The smoothed timing value is used to control the transmitter timing value in steps of ¼ of a bit period to follow the receiver timing by a specified number of bit periods, referred to herein as the transmitter timing offset.

The closed loop timing correction mechanism comprises the network base station receiving the mobile terminal signal and determining whether the slots are received late or early relative to an expected, ideal time-of-arrival. The base station then determines whether, on average, it is desirable to alter the transmitter timing offset between the mobile transmit and receiver timing. If so, a so-called time-advance command is transmitted from the network to the mobile terminal, thereby completing the closed loop correction mechanism.

In the GSM system, the mobile terminal may alter its transmitter timing according to the open loop mechanism in steps of ¼ of a bit period, or alter its transmit slot timing according to the closed loop mechanism in steps of more than one whole bit period. The timing offset is not critical in GSM. Because multipath propagation can change the propagation delays radically between one slot and the corresponding slot in the next frame, GSM receivers must in any case re-establish the channel propagation characteristics anew for each successive slot. There is thus no attempt to track the propagation channel changes between two successive frames.

In contrast to TDMA systems, code division multiple access (CDMA) systems generally employ continuous transmission, and attempt to track the channel changes due to multipath propagation, since there are no discontinuities at frame or slot boundaries to hinder channel tracking. Channel tracking allows more efficient receivers to be produced that operate at lower signal-to-noise plus interference ratios, which increases the capacity of CDMA systems. Advanced receivers using interference canceling techniques such as subtractive demodulation as described in U.S. Pat. No. 5,151,919 to Applicant, or coherent macrodiversity techniques as described in U.S. patent application Ser. No. 09/915,896, filed Jul. 26, 2001, entitled "Communication System Employing Transmit Macro-Diversity" to Applicant, are even more reliant on accurate channel tracking. If step changes are applied to mobile terminal transmitter timing, the accuracy of channel tracking is reduced, reducing the effectiveness of these advanced techniques.

The increase of CDMA bandwidths and chiprates has led to the need for further improvement in timing correction to prevent timing drift between a transmitter and a receiver.

SUMMARY OF THE INVENTION

This invention relates to a mobile terminal for a CDMA communication system comprising a transmitter and a receiver that use a common frequency reference. The receiver of the mobile terminal derives a frequency error attributable to its local frequency reference relative to the received signal, and forms a control signal to correct the mobile terminal's local frequency reference. The receiver also derives a timing error indicating whether the transceiver timing is early or late compared to known features of the received waveform. Due to the Doppler and multipath propagation in the mobile radio environment, correcting the frequency of transmission may allow a residual timing drift to remain. The mobile terminal of the present invention includes a timing correction circuit to smoothly correct such timing drift over a desired time interval without disruptive step changes. The present invention may be used, for example, to adjust chiprate and/or bitrate timing in a CDMA mobile terminal.

In one exemplary embodiment of the invention, the timing correction circuit generates a frequency offset value based on the timing error so that the local frequency reference is biased, and hence the CDMA chiprate, is gradually altered to correct the timing drift at the penalty of an alteration in the frequency of transmission. The distortion due to the frequency bias is insignificant in the context of CDMA system bandwidths.

In another embodiment of the invention, separate timing controllers are used for transmit and receive function. The timing controllers use the output frequency of a VCO as a timing reference. The timing correction circuit comprises a quadrature modulator that modifies the frequency reference output by the VCO to generate a modified frequency reference. The modified frequency reference is used to generate timing signals for transmit functions without changing the frequency reference used to generate timing signals for receive functions.

In another implementation of the present invention, the timing correction circuit comprises a transmit spectral shaping filter. The coefficients of the transmit spectral shaping filter are smoothly altered to change the filter delay while maintaining constant spectral characteristics to effectively alter the transmitter timing without effecting receiver timing.

In yet another implementation, transmit time alignment is accomplished by using a time-reverse-conjugate channel transmit prefilter.

DETAILED DESCRIPTION OF THE INVENTION

Figure 1:
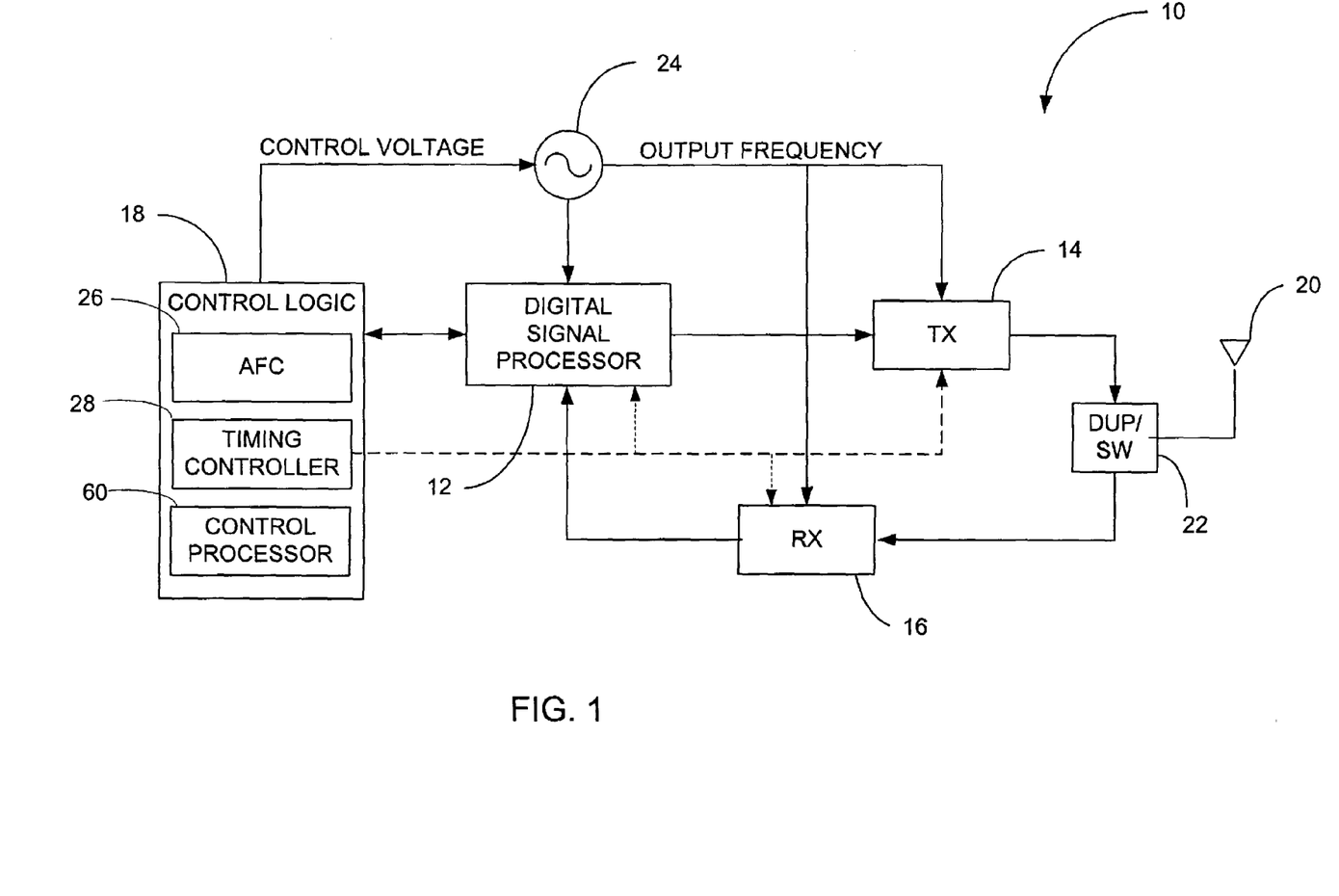
FIG. 1 is a functional block diagram illustrating a mobile terminal according to the present invention.

Referring now to the drawings, FIG. 1 illustrates the functional elements of a mobile terminal 10 for a Code Division Multiple Access (CDMA) wireless communication system in block diagram form. The mobile terminal 10 may comprise a fully functional radio transceiver operating according to known standards, such as cdma2000, Wideband-CDMA (W-CDMA), and the Universal Mobile Telecommunication System (UMTS) standards. The mobile terminal 10 comprises a digital signal processor (DSP) 12, a transmitter 14, a receiver 16, and control logic 18. The DSP 12 includes a transmit signal processor to generate signals for transmission by the transmitter 14 at a sample rate equal to or higher than a transmitter modulation symbol rate, and a receive signal processor to process signals received by receiver 16. Transmitter 14 and receiver 16 are coupled to a shared antenna 20 by means of a duplexer or switch 22. Transmitter 14 converts digital signals output by the DSP 12 to an analog waveform for modulation onto a radio frequency (RF) carrier, amplifies the analog transmit signals, and transmits the signals to a remote station via antenna 20. Receiver 16 amplifies and filters signals received via antenna 20, down-converts the received signals to the baseband frequency, and converts the received signals to digital form for input to the signal processing unit 12. The receiver 16 may, for example, convert the received signals to complex numerical samples. A frequency synthesizer 24 provides a frequency reference for transmitter 14 and receiver 16. Additionally, the frequency synthesizer provides a timing reference to the DSP 12 for the chip, bit and frame timing. Control logic 18 includes a control processor 18 to perform all of the control functions of the mobile terminal 10 including power control, frequency control, timing control, and channel selection.

Control logic 18 further includes an automatic frequency control (AFC) circuit 26 to compensate for frequency error in the VCO 24. Such frequency error may be a consequence of temperature, component variations, and a number of other factors. To correct such errors, the DSP 12 compares a locally generated frequency to a synchronizing frequency transmitted by a base station. The frequency difference between the locally generated signal and the synchronizing signal is then used to adjust the control voltage to the VCO 24. More particularly, the DSP 12 generates an error signal based on the difference between the frequency of the synchronizing signal and the frequency of the locally generated signal. The error signal is input to the AFC 26, which changes a control voltage output to the VCO 24 dependent on the error signal to compensate for any error. Various techniques for AFC are described in U.S. Pat. Nos. 6,278,867; 6,023,477, 5,742,908, and U.S. Pat. No. 5,568,518 to Applicant which are incorporated herein by reference.

The control logic 18 further includes a timing controller 28 to control the transmitter and receiver timing. In CDMA systems, it is important that transmissions be synchronized so that the orthogonality of transmitted signals is maintained. Due to Doppler and multipath propagation, a timing error accumulates and needs to be corrected to maintain time synchronization with the base station. In the prior art, timing drift is typically corrected in a step-wise fashion to maintain time synchronization with the base station. In the prior art, the receiver determines the timing of a received signal to some fractional chip accuracy, such as ¼ or ⅛th chip, and determines a mean timing from all received multipath rays of different delays. The mean timing of the transmitted chip sequence is then be periodically corrected in similar step units, e.g. ⅛th of a chip.

In third generation CDMA systems that have high chiprates, the step changes may be as much as ¼ of a chip period or larger, which can adversely effect receiver performance. For example, large step changes in timing to correct for timing drift may adversely effect receivers 16 that employ channel tracking, subtractive demodulation, and/or interference cancellation.

The specification for UMTS no. TS 25.133 V3.1.0, dated March 2000, at section 7.3.11 specifies mobile terminal transmitter timing accuracy of +/−1.5 chips and a correction rate of not more than ¼ chip/280 mS. The step size of the timing corrections is not specified in the standard. The maximum rate of correction specified corresponds to a maximum speed of 156 miles/hour (250 km/hour). Causing the mobile terminal's transmitter timing to follow its receiver timing results in the signal received at the base station drifting at twice the rate, i.e. at 0.5 chips per 280 mS. If it is important for the signal received at the base station to be within a certain timing window, then a timing adjustment command would be needed to be sent to the mobile terminal 10 periodically. Since such commands are relatively cumbersome and therefore infrequent, the size of the adjustment needed would likely be several chips. To avoid an undesirable step change of timing of this magnitude, the timing change should not be abrupt but smooth. The change in timing should preferably occur in increments of less than ¼ chip and ideally be a continuous change with no discrete steps.

The problem of timing drift is more acute with satellite systems, particularly low earth orbit satellites that move with high velocity. Moreover, due to the relatively low multipath delay spread on satellite paths, it is feasible to use orthogonal CDMA coding on the reverse link, and should such be desired, the timing accuracy must be maintained well within +/−1 chip accuracy to maintain orthogonality.

The present invention provides a method of smoothly correcting timing drift of a local timing controller 28 in transceivers over a finite time period without making disruptive step changes. In general, the timing adjustments are made in increments smaller than one signal sample period of the sample rate used to generate the transmitted signals. In general, the timing adjustments are made at a rate slower than the receiver is adapted to expect. In one embodiment, the timing adjustments are small enough and at a slow enough rate so as to be imperceptible to a receiver adapted to follow normal changes in the propagation channel. The time period over which such timing adjustments are made is typically longer than approximately 1 msec. The present invention may be used in open loop timing control to correct timing drift responsive to a detected receiver timing error. The present invention may also be used in closed loop timing control to comply with timing adjustment commands received at a mobile terminal. Further, while the present invention is particularly useful in mobile terminals for CDMA systems, the present invention may also have utility in base stations and in communication systems that do not employ CDMA.

One exemplary embodiment of the invention corrects timing drift by controlling the VCO 24 so that the timing drift is reversed in direction and is of a rate that will correct the accumulated timing drift in a finite time period. The specified maximum rate of change of ¼ chip per 280 mS in UMTS, for example, equates to a relative chiprate change of 0.23 parts per million (ppm). If the VCO 24 is changed by this amount, a frequency error of typically 460 Hz will arise on a 2 GHz transmit frequency. So long as this frequency error does not change abruptly, it is negligible in comparison to the 5 MHz channel bandwidth of the UMTS system. In fact, this frequency error at the mobile terminal 10 is exactly what is required to cancel at least part of the average loop Doppler frequency error, i.e., it is in such as direction as to reduce the net, mean frequency error seen at the network base station to which the mobile terminal 10 is adjusting. One implementation of the invention therefore comprises adding a bias to the frequency error determined by the signal processing unit 12 such that the VCO 24 will be corrected to a value offset by the added bias. The frequency offset is chosen to correct a desired amount of accumulated timing drift in a given time, but in any case being limited to ¼ chip per 280 mS.

For example, if the decoder 30 determines that the current receiver timing is ⅛ chip delayed from a previous ideal or zero timing error value, this timing error could be corrected by making a +0.23 ppm change to the reference oscillator frequency for 140 mS, or a +0.115 ppm change for 280 mS, or a 0.032 ppm change for 1 second. If the frequency offset value is changed every time the timing error is redetermined, a first order servo system having one integration in the loop results.

Figure 2:
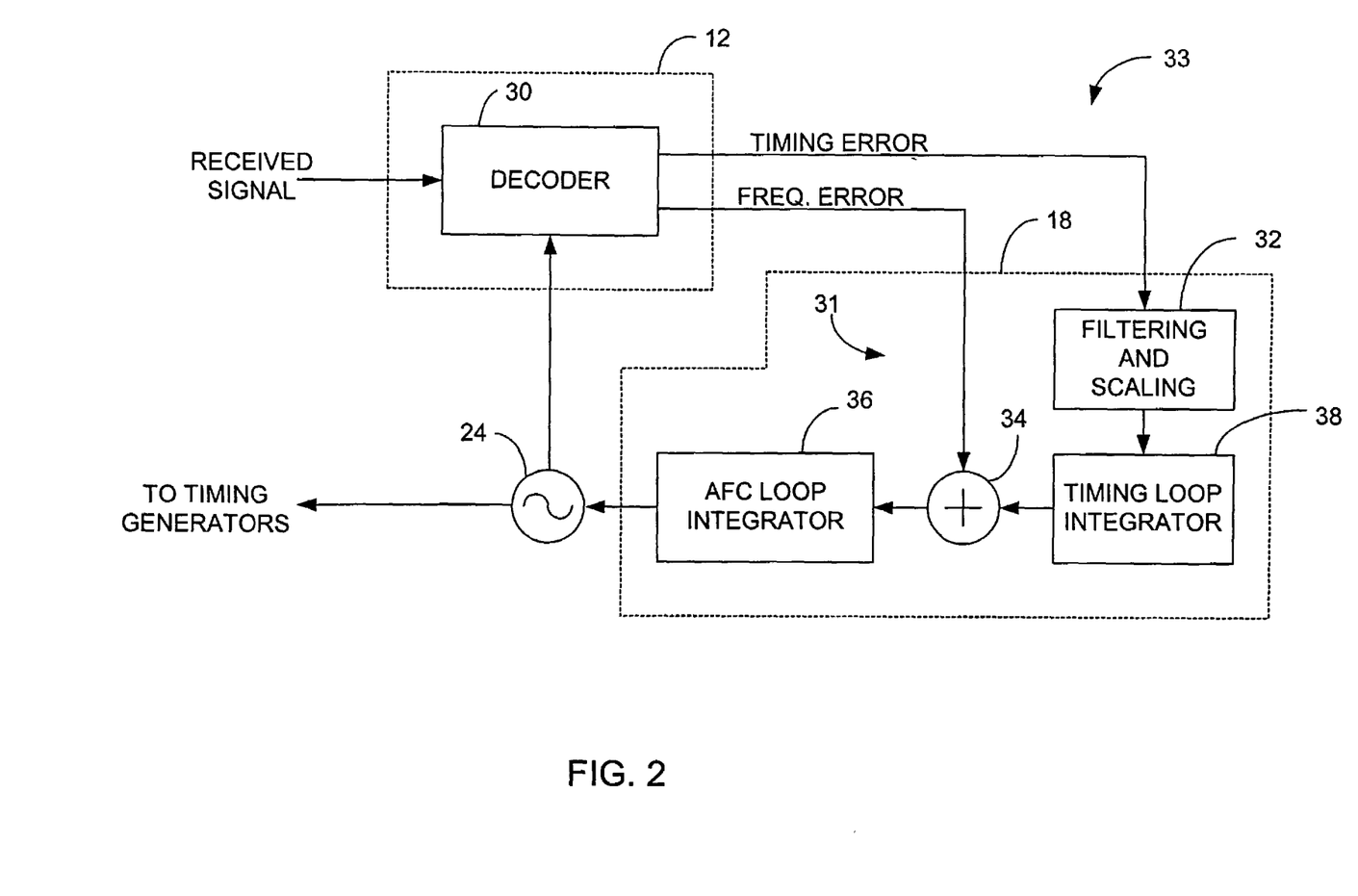
FIG. 2 is a functional block diagram illustrating the AFC loop in a first exemplary embodiment of the invention.

FIG. 2 illustrates exemplary details of one embodiment of the mobile terminal 10 that uses this frequency bias technique to correct timing drift. The received signal comprising a sequence of complex numerical samples is input to decoder 30 in the DSP 12 to extract wanted information as well as to determine time synchronization with the received signal and the frequency error of the receiver 16 relative to the received signal. The receiver 16 and decoder 30 use VCO 24 as the local time and frequency standard. The determined frequency error is indicative of inaccuracy in the VCO output frequency. The frequency error is input to AFC 26, which includes an AFC loop 31 and a timing correction loop 33. The frequency error is fed back to AFC loop 31 and integrated in AFC loop integrator 36 to produce a corrected voltage for controlling VCO 24 thereby forming a first order negative feedback loop (first order=one integration in the feedback loop). As described below, the timing correction loop 33 biases the frequency error fed back to the AFC 26 to induce a timing drift that will correct the accumulated timing drift in a finite period of time.

For CDMA signals, decoder 30 may be the well-known RAKE receiver. A RAKE receiver correlates a received spread spectrum signal with a locally generated spread spectrum code over each symbol period to produce a despread value per symbol period. Due to multipath propagation of various delays, the correlator correlates different time shifts of the received signal with a symbol-length segment of a locally generated spread spectrum code to produce a correlation result for each multipath ray of significance. The correlation results are then combined with weighting factors to produce a "soft" symbol value for further decoding using an error correction decoder 30. Which time shifts of the received signal gave significant correlation values is indicative of the mean time synchronization error. For example, if the RAKE receiver produces correlation results for time shifts of the received signal ranging from 10 chips retarded (assuming a multipath ray arrived 10 chips early) to 10 chips advanced (assuming a multipath ray arrived 10 chips late) relative to the local code generator, then if all significant correlations occurred with the received signal retarded compared to the nominal position, it is indicative that the local code generator timing is running "slow". The frequency of the clock for the local code generator should then be increased to align the receiver timing more centrally with the received signal. Conversely, if the RAKE receiver produces significant correlation values mainly with the received signal advanced relative to the nominal time alignment, it is indicative of the local code generator running "fast," so that the clock frequency should be reduced.

In the current art, receiver timing is commonly handled by a digital master timing unit that includes a counter for counting cycles of VCO 24. The period of the counter in cycles is chosen to be some convenient repetition period of the signal waveform, for example, symbol periods, slot periods comprising a number of symbol periods, or frame periods comprising a number of slot periods. The instantaneous value of the counter is continuously compared with a number of preset counts to produce trigger pulses for various internal control purposes when a preset count is reached. Control logic 18 adjusts the preset count values to adjust the timing at which internal events occur, such as producing a segment of locally generated spread spectrum code, or converting a segment of received signal waveform and storing complex numerical samples from the receiver 16 in memory starting at a specific address. For example, if a trigger pulse is produced to store received signal samples starting at memory address X, and 10 chips later a second pulse triggers the local code generator to produce a segment of spread spectrum code, then correlating the locally produced code with signal samples starting at address X is equivalent to correlating the code with the received signal retarded by 10 chip periods, as discussed above. Correlating the local code segment with signal samples starting at address X+20 is then equivalent to correlating with the received signal time advanced by 10 chips.

In the present invention, adjusting the preset trigger points using the control logic 18 may still be performed to obtain coarse initial synchronization. Initial synchronization of a CDMA mobile terminal 10 usually occurs upon power-up, and is done by searching for correlation with a known pilot code or other known signal component included in all network transmissions. However, instead of adjusting the preset trigger timings in a stepwise fashion thereafter to correct timing drift, the timing error determined by decoder 30, which is indicative of whether the local clock (i.e., VCO 24) is running fast or slow, is used to bias the frequency reference output by VCO 24 away from the value that would have resulted from action of the AFC loop alone. The timing error is output by decoder 30 to timing correction loop 33, which computes a frequency offset to bias the AFC loop 31. The bias is computed by filtering the timing error output by decoder 30 in filtering and scaling unit 32 to remove jitter and scaling it to obtain a frequency bias that will correct the filtered timing error, if it persists, after some finite time. Filtering and scaling unit 32 may be followed by a loop integrator 38 that forms a second-order negative feedback loop for correcting timing error. The computed frequency offset is then added in bias adder 34 to the frequency error output by the decoder 30 ahead of the AFC loop integrator 36, sto generate a modified frequency error that fools the AFC loop 31 into believing that the frequency error from decoder 30 is otherwise than was really measured. If the bias was added after AFC loop integrator 36, the AFC loop integrator 36 would merely ramp up or down until the frequency error input was zero, and the frequency bias would have only a temporary effect. The addition of the bias before the AFC loop integrator 36 causes the AFC loop 31 to settle with a permanent frequency error equal to the inverse of the frequency bias, which frequency error results in the internal timing of decoder 30 smoothly changing to reduce the timing error. Thus, the timing correction loop 33 functions as a timing correction circuit. If the timing correction loop 33 is a first order loop, the timing error would theoretically decay exponentially to zero.

Correcting the VCO 24 output frequency using frequency error alone does not stop timing drift because the frequency can have a bias due to multipath propagation relative to the value required to maintain timing. For example, a mobile terminal 10 traveling away from the base station transmitter would be expected to experience increasing delays of the received signal, i.e. the receiver's clock would appear to be running fast. On the other hand, multipath rays can be reflected from objects forward of the mobile terminal's direction of travel, thereby causing the received signal frequency to be Doppler-shifted to the high side, so that the VCO 24 would be deemed to be running slow. After passing the reflecting object, the multipath ray from that object may disappear while a ray reflected from another object forward of the direction of motion replaces it, still with positive Doppler shift despite the received signal now being further delayed. Thus, there is a frequency bias in the AFC loop 31 relative to the frequency required to track timing accurately. This frequency bias may be hard to predict due to the reflecting objects in the environment being arbitrarily located. Therefore filtering and scaling unit 32 may not accurately determine the fixed bias necessary to correct timing drift. Instead, if the timing error persists of a given sign, an increasing bias should be generated that will eventually overcome the AFC bias (i.e., the frequency bias generated by the timing correction loop) and correct the timing error, which is the function of the timing loop integrator 38. Timing loop integrator 38 produces an increasing magnitude of bias as long as timing error of the same sign persists. The use of a timing loop integrator 38 makes the timing correction loop 33 a second order loop, because controlling frequency of VCO 24 to correct timing error already comprises a first implicit integration.

The methods of designing stable second order control loops are well known from the theory of phase-lock loops. The explicit timing loop integrator 38 may include a real zero (lead factor) to provide a desired damping factor. Filtering and scaling unit 32 is then also known as a Proportional and Integral (PI) controller. A method for producing second order phase- or timing-locked loops with a variable bandwidth while maintaining a desirable damping factor using PI control is described in U.S. Pat. No. 5,095,288 entitled "Phase-locked loop having a variable bandwidth" which is hereby incorporated by reference herein. For purposes of the present invention, the PI controller can be conveniently implemented as a software routine in the main Control logic 18 for the mobile terminal 10.

The exemplary embodiment of the present invention described above with reference to FIG. 2 corrects timing drift of the local timing controller 28 so that the transmitter timing does not have to be corrected in a stepwise fashion. It does not matter if receiver timing is corrected for receiver purposes in a stepwise fashion, as those steps are imperceptible outside of the transceiver. Thus trigger pulses produced by the master timing controller that are used by receiver 16 and decoder 30 may continue to be adjusted in discrete steps, if such is useful to maintaining optimum receiver performance, but the trigger pulses used for transmitter timing purposes are preferably left fixed once set. This avoids the receiver at the base station from experiencing undesirable timing jumps at random.

If the mobile terminal 10 is moving away from the base station, the signal transmitted by the mobile terminal 10 will be increasingly delayed as received by the base station, due to the lengthening go-and-return path. If the base station requires the received signal to lie within a certain timing window, it may eventually be necessary for the base station to command the mobile terminal 10 to advance its transmitter timing. Since such an adjustment would not be random, but would occur under the control of the base station, it may be acceptable for a step change in transmitter timing to occur under these circumstances. However, the invention may also be used to effect a smooth transmitter timing transition when commanded by the base station.

Figure 3:
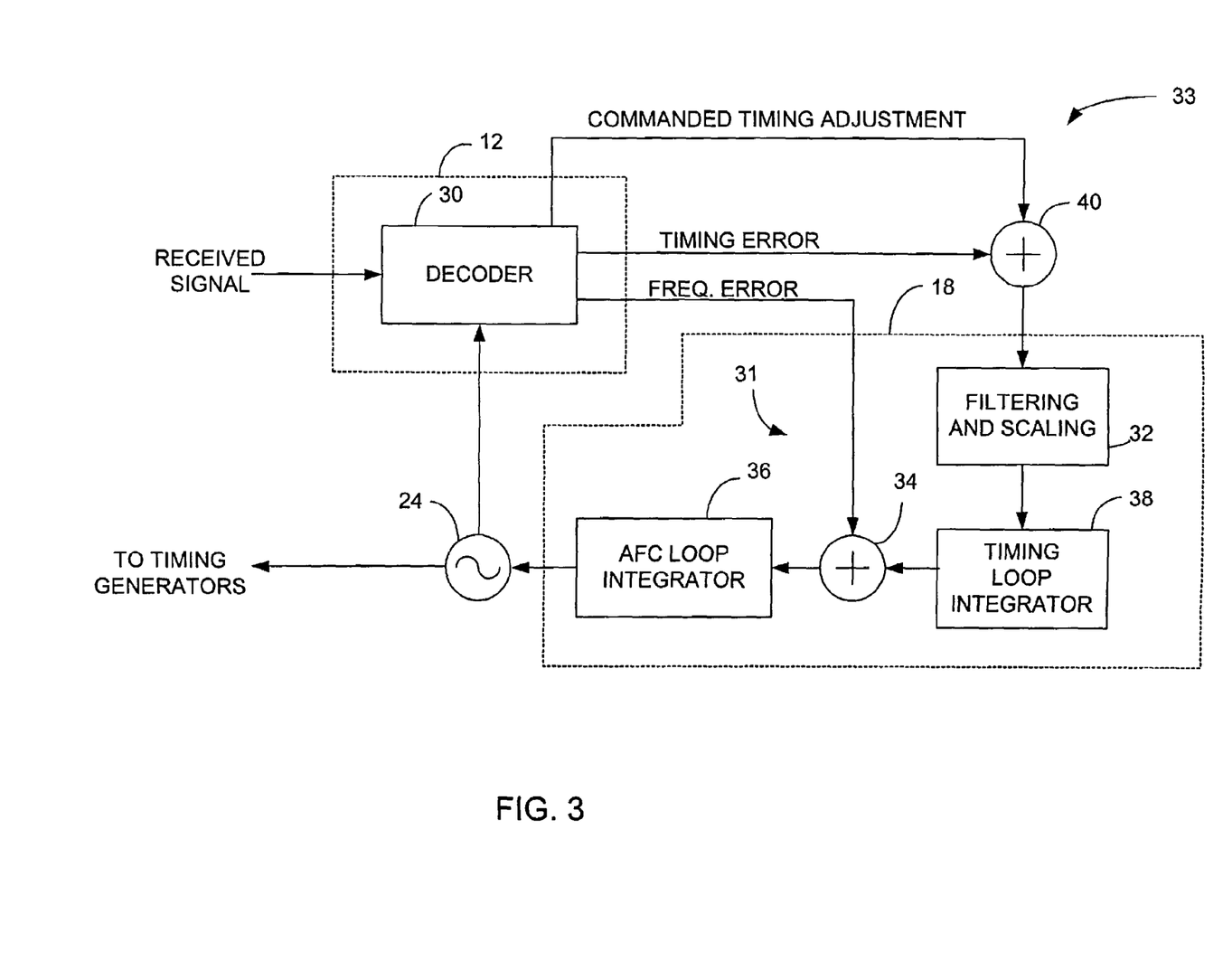
FIG. 3 is a functional block diagram illustrating the AFC loop in a second embodiment of the invention.

The base station sends a message which is decoded by the mobile terminal 10 to indicate the transmit time offset that shall be used to determine transmitter timing from receiver timing. In other words, transmitter timing shall be biased relative to receiver timing by a time offset valve commanded in the message received from the base station. This time offset valve can then be added to the receiver timing error determined by decoder 30, as shown in FIG. 3, which addition may be done ahead of the principal timing loop integrator 38 for the same reason as described above for the addition of frequency bias ahead of the AFC loop integrator 36. Decoder 30 decodes a message containing a commanded time offset valve. The time offset valve is combined in timing bias adder 40 with the timing error determined for the received signal to produce a biased timing error. The biased timing error is then filtered and scaled by a suitable factor chosen to obtain the desired rate of change of timing in response to the timing adjustment command in filtering and scaling unit 32, and integrated in timing loop integrator 38. The timing loop integrator 38 produces an increasing magnitude of frequency bias to bias adder 34 in response to the biased timing error persisting at a non-zero value, such that the biased timing error is eventually caused to fall to zero in the mean. At that point, the timing controller 28 will have altered the transmitter timing to the value desired by the base station, but in doing so, the receiver timing will also have been biased. However, the receiver timing can be changed back to the optimum receiver timing window by altering the trigger pulse timings associated with receive functions. As was discussed above. When the receiver trigger pulse timings are so adjusted, the receiver timing error output from decoder 30 should be the measured receiver timing error combined with the amount of trigger pulse adjustment made so as to maintain the correct value of receiver timing error. If this is not done, adjusting the receiver trigger pulse positions would cause the output timing error to appear to be around zero, so that the commanded timing adjustment plus measured receiver timing did not settle to zero, as intended. Ultimately, the receive trigger pulses will move in response to the VCO 24 frequency bias until the difference in receive trigger pulse timing and transmit trigger pulse timing has changed by the commanded amount.

In FIGS. 2 and 3, biasing the output frequency of VCO 24 to smoothly shift the transmitter timing has the side effect of also shifting receiver timing, which may be compensated for by altering receive trigger pulse settings. It may be considered simpler if the transmitter timing could have been smoothly altered without altering the receiver timing. One method of accomplishing this is to use different master timing controllers for receive and transmit functions, and to drive the transmitter timing controller with a clock derived by offsetting the VCO 24 frequency as shown in FIG. 4.

Figure 4:
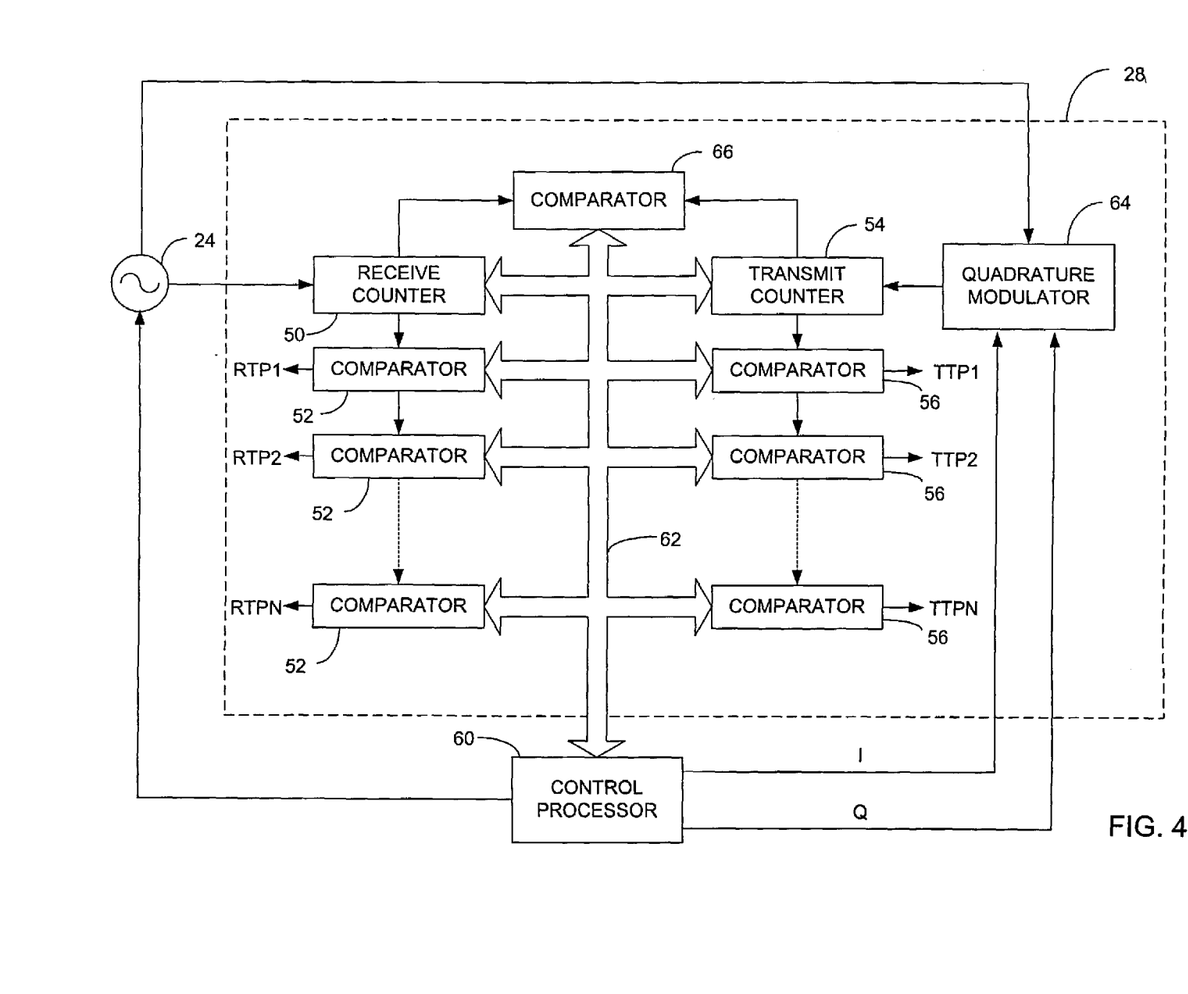
FIG. 4 is a functional block diagram illustrating the timing controller in a third embodiment of the invention.

FIG. 4 illustrates exemplary details of an alternate embodiment of the invention that uses a modified frequency reference to generate transmit timing signals. FIG. 4 shows a timing controller 28 that derives its timing reference from VCO 24. VCO 24 drives a receive counter 50 and transmit counter 54. The bits of receive counter 50 are connected to a series of digital comparators 52 numbered 1 to N that compare the counter value with trigger pulse timing settings provided by a control processor 60 via the two-way buss 62. When the receive counter value reaches the value of a trigger pulse setting for a given comparator 52, the comparator 52 outputs a trigger pulse (TP). In FIG. 4, receive trigger pulses are denoted by the reference characters RTP and transmit trigger pulses are denoted by the reference characters TTP. A similar timer for transmit functions uses transmit counter 54 connected to comparators 56. Transmit counter 54 is, however, driven by a modified frequency reference. More particularly, the frequency reference output by VCO 24 (referred to as the unmodified frequency reference) is modified to change its frequency or phase, for example using a quadrature modulator 64 as a continuous phase rotator. A control processor 60 provides two control signals (I,Q), using digital-to-analog (DtoA) converters as necessary to the quadrature modulator 64. The control signals are equal to the cosine and the phase respectively of the desired phase rotation to be applied to the unmodified frequency reference output by VCO 24. Thus by generating successive I,Q values following cyclic Cos/Sin functions, the phase of the reference signal driving the transmit counter 54 may be progressively advanced or retarded continuously so as to smoothly advance or retard the timing of transmit signals relative to receive timing signals. In this embodiment, the quadrature modulator 64 and control processor 60 function as a timing correction circuit.

Optional comparator 66 compares the current values in the transmit and receive counters 50, 54 and provides the difference to control processor 60 so that it can track the whole number of cycles of advance/retard that it has inserted. To avoid logic race problems, control processor 60 may ask for a difference value from comparator 66 only when quadrature modulator 64 is applying a specific phase shift (such as zero) to the frequency reference from VCO 24, and the counters 50, 54 are then incrementing at approximately the same time and have an overlapping period of stability. The granularity of the transmitter timing shifts that may be implemented with this method is determined by the accuracy of the DtoA converter used by the control processor 60 to generate the I,Q signals. The use of 8-bit DtoA converters produces timing changes of about $\frac{1}{256}$th of a VCO cycle period.

Figure 5:
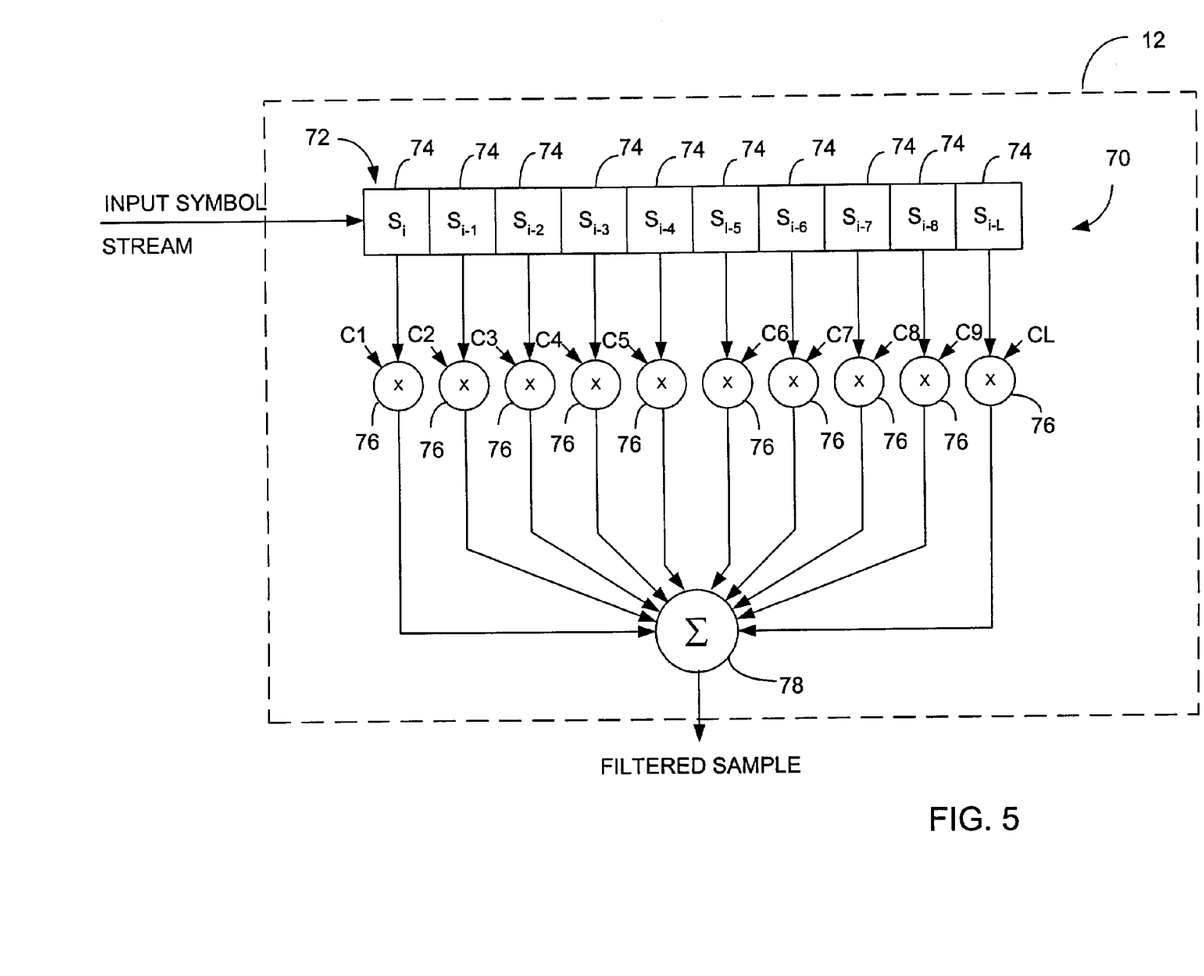
FIG. 5 is a functional block diagram illustrating a transversal filter in a fourth embodiment of the invention.

FIG. 5 illustrates exemplary details of yet another embodiment of the present invention that uses a filtering technique to smoothly advance or retard transmitter timing. FIG. 5 illustrates a spectral shaping transversal filter 70 with variable coefficients that may be implemented for example in DSP 12. Four such filters can be used to generate four samples per symbol as described in U.S. Pat. No. 6,429,798 to Applicant, entitled "Combined transmit filter and D-to-A converter," which is incorporated herein by reference. The incorporated patent application describes the use of multiple transversal filters connected to a shift register for producing filtered waveform samples at a sample rate of several samples per symbol from a one-sample-per-symbol stream. Each of four transversal filters 70, for example, can form one of the four samples per symbol corresponding to sampling instants of 0, $\frac{1}{4}$, $\frac{1}{2}$ and $\frac{3}{4}$ of the way through each symbol period. The transversal filters 70 are used cyclically to produce a filtered stream of four samples per symbol. In principle, there is no limit to the fineness of the sampling that can be produced using this method. For example, using 16 transversal filters 70 can produce a filtered output of 16 samples per symbol. However, such a high oversampling factor is not usually necessary for merely containing the transmit spectrum. Four samples per symbol usually suffices, and the four sample per symbol stream may be passed through a continuous time (e.g. RC) low-pass filter of moderate complexity to complete the filtering and produce a true, time-continuous waveform. If the aforementioned 16-filter implementation is constructed therefore, it suffices to use only four of the filters at any instant, for example, those corresponding to sampling instants of 0, $\frac{1}{4}$, $\frac{1}{2}$ and $\frac{3}{4}$ of the way through the symbol period. Alternatively those corresponding to the sample instants 1/16, 5/16, 9/16 and 13/16 of the way through a symbol period can be used. The latter produces a waveform delayed 1/16th of a symbol period relative to the former. To produce finer delay control than this, it is undesirable to have more than 16 filters from which to select only four at any time. Instead, four filters with variable coefficients can be used. Indeed, a single filter with variable coefficients can be used as shown in FIG. 5. The filter first uses coefficients to form an output sample corresponding to a sampling instant of To from the start of a symbol period boundary. Then the coefficients are altered to form a sample corresponding to $T_o+0.25$ symbol periods, followed by $T_o+0.5$ and $T_o+0.75$, then returning to $T_o$ and repeating cyclically. The four sets of coefficients may be precomputed for any value of $T_o$. Therefore, if it is desired to change the transmitter timing by an amount dT, the coefficients shall be computed for the four sampling instants $T_o+dT$, $T_o+0.25+dT$, $T_o+0.5+dt$ and $T_o+0.75+dT$.

The transmit waveform timing may be gradually and progressively shifted by increasing or decreasing dT. When dT just exceeds 0.25 symbol periods; it will be realized that the sample for $T_o+0.25+dT$ (where dT is reduced by 0.25) may be used for the first sample ($T_o+dT$ where dT is not so reduced). The sample for $T_o+0.75+dT$ can be formed by using the $T_o+dT$ sample (with dT reduced by 0.25) with a one symbol shift of the input symbol stream. This arrangement is illustrated in FIG. 5.

The spectral shaping filter 70 is composed of a shift register 72 with delay elements 74 to delay the input symbol stream so that L successive symbols are available in parallel. Each of the L delayed symbols is weighted in a respective one of multipliers 76 by multiplication with one of the L filter coefficients C1 to CL. The weighted symbols are then summed in summer 78 to produce a filtered signal sample.

Figure 5A:
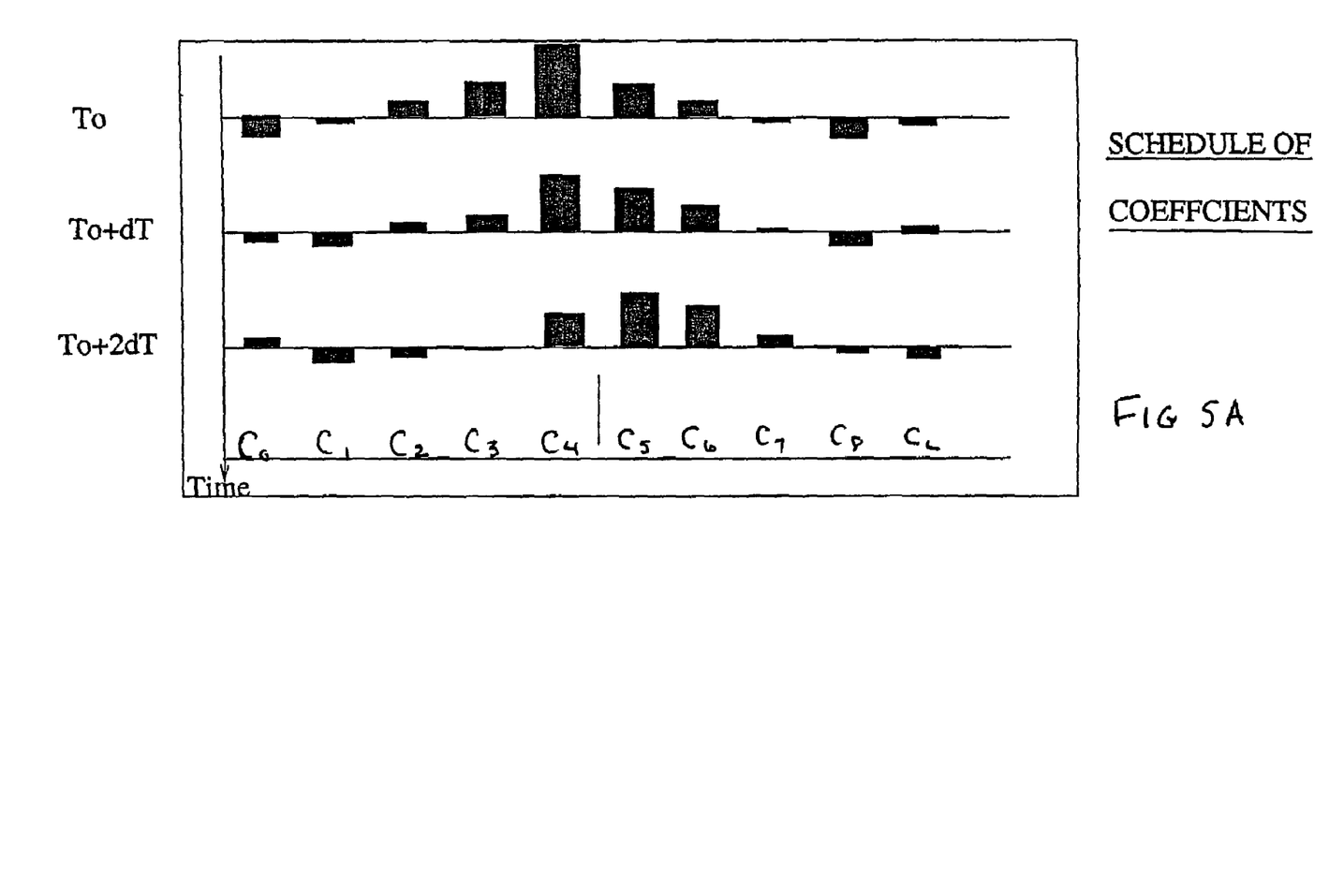
FIG. 5A is a graph illustrating the schedule of filter coefficients for the embodiment shown in FIG. 5.

By using coefficients selected successively from the schedule illustrated in FIG. 5A, multiple signal samples are produced over one symbol period, i.e. between shifts of delay register 72, resulting in an output signal comprising several samples per symbol period.

Each set of coefficients in the coefficient schedule corresponds to a sample computed for a different sample instant through the symbol period, for example, $T_o$, $T_o+0.25$, $T_o+0.5$, and $T_o+0.75$. After using all sets of coefficients, the delay register shifts in the next symbol and the schedule repeats. The set of coefficients for time $T_o=dT$ from the start of the symbol period may be computed from the inverse Fourier transform of the function $$EXP(jw.dT)H(w), \qquad Eq. (1)$$

where H(w) represents the desired transmit spectral shaping. Eq. (1) may be evaluated at 64 values of w equally spaced over the range −2B to +2B where B is the modulated signal bandwidth. Then the inverse FFT of the 64 values is computed to obtain 64 points of the impulse response. The 64 impulse response values are then decimated into 4 sets of 16 samples each by taking points 1,5,9 . . . , etc as the first set; 2,6,10 . . . , etc. as the second set and so on, to obtain a schedule of four sets of 16 coefficients, the sets corresponding to $T_o$, $T_o+0.25$, $T_o+0.5$ and $T_o+0.75$ where the fraction refers to a fraction of the symbol duration. To advance the transmit signal by one quarter of the symbol period, it suffices to start the schedule with the second of the sets of coefficients, and to advance the shift register 72 after using the fourth set, the first set of coefficients being used after the shift register 72 has been advanced. It will be realized that this is identical to merely altering the timing by 1/4 of a symbol period, which presupposes that a 4×chiprate clock is available. However, we wish to advance or delay the signal by smaller fractions of the symbol period, such as 1/100th, without implying the need for a 100×chiprate clock, which would be impractically high. This may be done by setting the value of dT in the above formula to dT=+/−0.01 (of a symbol period) and recomputing the sets of coefficients. The slightly modified coefficients result in the filter output signal being advanced or delayed by the desired 1/100th of a symbol. Thus by continuously and smoothly updating the coefficient sets by delta-amounts, the filter output signal may be smoothly delayed or advanced in arbitrarily small steps. The minimum value of dT may be determined in advance based on the desired fineness of the time adjustments and the filter coefficients may precomputed and stored in a memory. For example, minimum value of dT may be chosen to be 1/4 or 1/16 of a sample period. The computation of filter coefficients may be performed by the DSP 12 or by a control processor 60 forming a part of the control logic 18. Alternatively, adaptive control algorithms may select any the value of dT and the filter coefficients may be computed in real time.

The need to maintain the time-of-arrival of the signal at the network base station within tight time limits can be questioned when multipath propagation results in multiple delayed copies of the signal arriving with different delays. It may usually be more important to ensure that the delay does not change abruptly, by using one of the methods above to implement smooth timing changes. However, when an attempt is made to gain advantage by using orthogonal CDMA on the uplink, which can be advantageous despite multipath propagation, it is important to maintain time-of-arrival of different signals within a fraction of a chip of each other. In Applicant's U.S. patent application Ser. No. 09/939, 006 titled "Communication System Employing Channel Estimation Loop-Back Signals" filed Aug. 24, 2001, it is disclosed that a transmitter, with knowledge of the multipath channel provided by feedback from the receiver, can prefilter its transmit signal using the time-reverse-conjugate of the channel impulse response to improve communications performance. The above application is incorporated by reference herein. A definition of the time-reverse-conjugate channel that is useful in the context of maintaining timing without abrupt changes is illustrated in FIG. 6.

Figure 6:
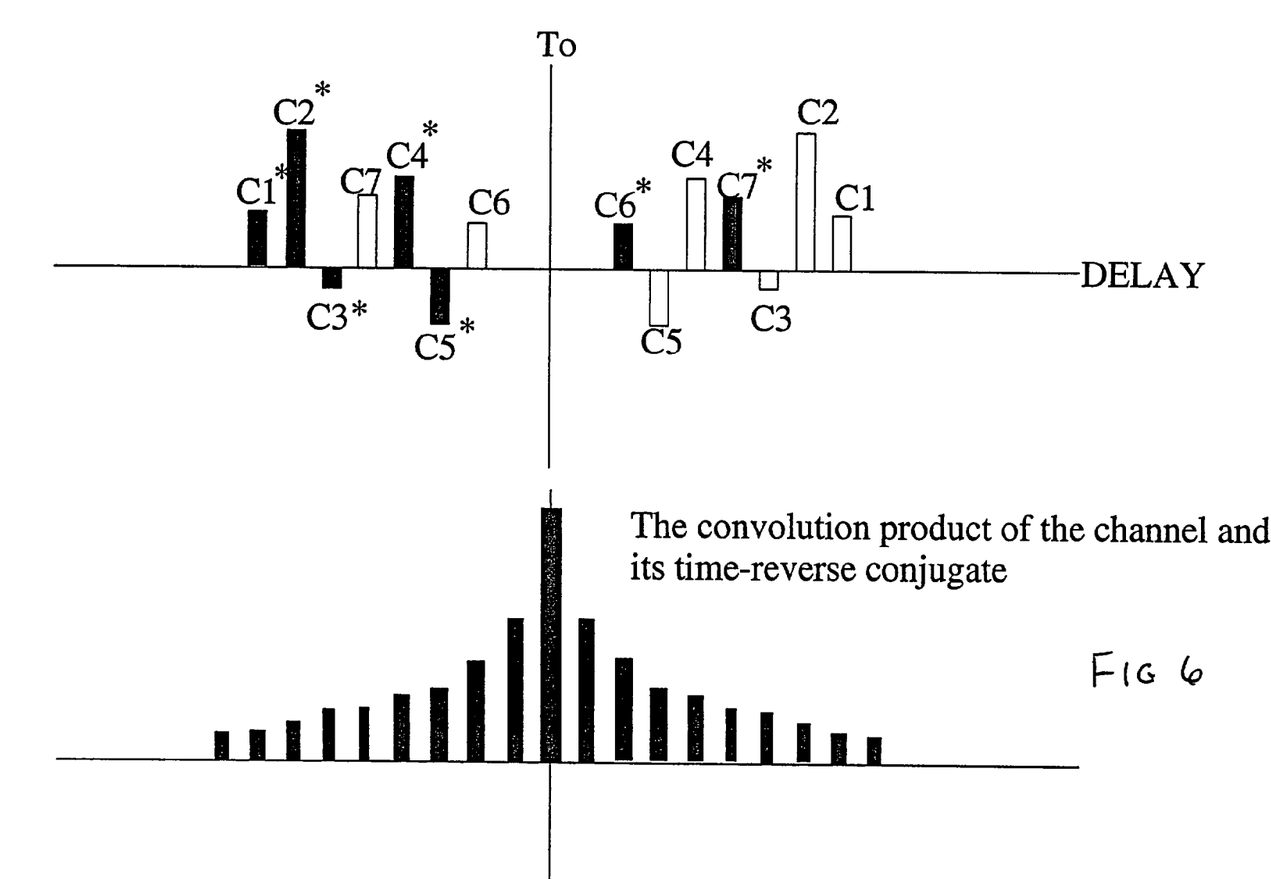
FIG. 6 is a graph illustrating prefiltering the transmit signal using a time reverse conjugate function.

FIG. 6 illustrates the relative amplitudes and delays of multipath rays having complex propagation coefficients C1,C2 . . . C7. The unshaded bars represent the rays as they arrive at a base station receiver. It is assumed that there is an ideal time of arrival $T_o$, to which the base station receiver would prefer all multipath rays from all mobile terminals 10 conform. Some of the multipath rays arrive earlier than $T_o$ and some later than $T_o$ however. The shaded bars indicate the time-reverse-conjugate channel with coefficients C1* . . . C7*. The channel is time-reversed by mirroring in the vertical axis at $T_o$. Thus, a multipath ray arriving later than $T_o$ gives rise to a conjugate prefilter tap coefficient for a corresponding amount of delay earlier. Were there only one multipath ray, this would result in exact compensation for the timing. The filter taps and the channel coefficients are assumed to correspond to one symbol time spacing. Despite this granularity, fraction symbol periods of delay are correctly treated. When a multipath ray arrives a fraction of a symbol period from the ideal time $T_o$, the receiver, sampling the received signal at $T_o$, perceives the multipath ray to have split into several multipath rays lying on symbol-spaced boundaries around $T_o$. When a transmit prefilter is used that is the time-reverse-conjugate of this perceived multipath channel, the signal perceived at the receiver becomes as shown in the lower picture, having maximum energy equal to 1C112+JC2J2 . . . +JC712 and lower amounts of energy at delays on either side of the maximum. Thus the time-reverse-conjugate prefilter produced by mirroring the channel around $T_o$ results in received signal energy being cast largely into a multipath ray or RAKE tap at delay $T_o$, which is the receiver's preferred sampling point.

When this implementation is used in a CDMA system, the usual multitap RAKE receiver may be simplified, as the effective matched filtering function applied by the RAKE receiver has now been performed by prefiltering at the transmitter. Thus it has been shown that transmit prefiltering using the time-reverse-conjugate of the propagation channel measured at the receiver is another way to ensure correct transmitter timing, and may be adapted slowly to track changing channel conditions by updating the prefilter coefficients by small amounts at small time intervals.

The above-incorporated application also describes how, in a duplex communications system, a receiver can feedback via its associated transmitter loopback information on the perceived multipath propagation channel. The above application disclosed the loopback concept primarily with regard to improving communication from the base station to the mobile station, however it can equally be applied to the other direction. If desired, the loopback concept may be implemented in both directions symmetrically.

In the foregoing specification, several implementations of the invention have been described that achieve smooth adjustment of the transmitter timing of a digitally coded transmission system, such as a CDMA system. Modifications to the implementations may be made by a person skilled in the art without departing from the spirit and scope of the invention as described in the attached claims.

What is claimed is:

1. A wireless transceiver comprising:
   a receiver to receive coded information signals;
   a transmitter to transmit coded information signals;
   a local oscillator providing a time and frequency reference for said receiver and said transmitter;
   a timing controller providing timing signals for said receiver and said transmitter;
   a signal processor to decode said coded information signals received by said receiver and to determine a timing error associated with said timing controller based on said received coded information signals; and
   an automatic frequency control circuit outputting a control signal to said local oscillator responsive to a frequency error to adjust the frequency reference output by said local oscillator, said automatic frequency control circuit including an integrator to integrate said frequency error to generate said control signal;
   a timing correction circuit to smoothly adjust timing of said coded information transmitted by said transmitter responsive to said timing error to reduce said timing error over a desired time interval, said timing control circuit comprising:
      a timing correction loop to generate a frequency offset value based on said timing error that modifies the frequency error so as to bias the frequency reference output by said local oscillator in a manner to reduce the timing error,
      a scaling and filtering unit to smooth the timing error over a predetermined period of time;
      an integrator to integrate said timing error to generate said frequency offset value to produce an increasing frequency bias as long as the sign of the timing error remains the same.

2. The wireless transceiver of claim 1 wherein a time offset value is added to said timing error output by said signal processor to generate a biased timing error value, and wherein said timing correction circuit adjusts said timing error to said time offset value.

3. The wireless transceiver of claim 1 wherein said time offset value is extracted from said coded information signal received by said receiver.

4. A wireless transceiver comprising:
   a receiver to receive coded information signals;
   a transmitter to transmit coded information signals;
   a local oscillator providing a time and frequency reference for said receiver and said transmitter;
   a timing controller providing timing signals for said receiver and said transmitter;
   a signal processor to decode said coded information signals received by said receiver and to determine a timing error associated with said timing controller based on said received coded information signals;
   a timing correction circuit to smoothly adjust timing of said coded information transmitted by said transmitter responsive to said timing error to reduce said timing error over a desired time interval, said timing correction circuit comprising:
      a continuous phase rotator responsive to phase control signals to modify said frequency reference output by said local oscillator to generate a modified frequency reference;
      a transmit timing signal generator including a transmit counter to generate timing signals for said transmitter from said modified frequency reference;
      a receive timing signal generator including a receive counter to generate timing signals for said receiver from said unmodified frequency reference;
      a comparator to compare current values of the receive and transmit counters to provide a difference value;
      a control processor for tracking an accumulated advance or delay of the transmit timing signals relative to the receive timing signals and for generating said phase control signals.

5. The wireless transceiver of claim 4 wherein said continuous phase rotator comprises a quadrature modulator.

6. A method of correcting transmit timing in a wireless transceiver having a transmitter, a receiver, a local oscillator providing a time and frequency reference for said receiver and said transmitter, and a timing controller providing timing signals for said transmitter and said receiver to control transmit and receive timing respectively, said method comprising:
   decoding a received information signal in a decoder;
   determining a timing error associated with said timing controller by comparing a local time reference to a time reference derived from said received information signal;
   smoothly adjusting the transmit timing of said transceiver over a desired time period responsive to said timing error to correct said timing error by modifying said frequency reference and using said modified frequency reference to generate said transmit timing signals for said transmitter;
   using said frequency reference output by local oscillator unmodified to generate said receive timing signals for said receiver;
   determining an accumulated advance or delay of the transmit timing signal relative to the receive timing signals by comparing the value of a receive counter used to derive said receive timing signals to the value of a transmit counter used to derive said transmit timing signals.

7. The method of claim 6 wherein smoothly adjusting the transmit timing of said transceiver over a desired time period responsive to said timing error to correct said timing error comprises modifying said frequency reference output by said local oscillator and using said modified frequency reference to generate said transmit timing signals for said transmitter.

8. The method of claim 7 using said frequency reference output by local oscillator unmodified to generate said receive timing signals for said receiver.

9. The method of claim 8 wherein modifying said frequency reference output by said local oscillator comprises changing the phase of said frequency reference output by said local oscillator in a continuous phase rotator.

10. The method of claim 9 wherein said continuous phase rotator comprises a quadrature modulator.

11. The method of claim 6 wherein smoothly adjusting the transmit timing of said transceiver over a desired time period responsive to said timing error to correct said timing error comprises filtering transmitted information signals in a finite impulse response filter to smoothly vary said transmit timing of the transmitted information signals.

12. The method of claim 11 wherein filtering transmitted information signals in a finite impulse response filter to smoothly vary said transmit timing of the transmitted information signals comprises progressively varying filter coefficients of said finite impulse response filter.

13. The method of claim 12 wherein said filter coefficients include a time reverse conjugate representation of an impulse response of the propagation channel between the transmitter and a remote station.

14. The method of claim 13 further comprising determining an impulse response of said propagation channel from a received information signal.

15. The method of claim 13 wherein said transceiver receives said impulse response of said propagation channel from said remote station.

16. A method of correcting transmit timing in a wireless transceiver having a transmitter, a receiver, a local oscillator providing a time and frequency reference for said receiver and said transmitter, and a timing controller providing timing signals for said transmitter and said receiver to control transmit and receive timing respectively, said method comprising:
  decoding a received signal to determine a timing error and frequency error;
  scaling and filtering the timing error over a predetermined period of time to smooth the timing error;
  integrating said timing error to generate a frequency offset value to produce an increasing frequency bias as long as the sign of the timing error remains the same;
  modifying said frequency error by adding said frequency offset value to said frequency error;
  integrating said modified frequency error to generate a control signal to control said local oscillator so as to bias the frequency reference output by said local oscillator in a manner that smoothly adjusts said transmit timing over a desired time period.

* * * * *